United States Patent Office 3,423,274
Patented Jan. 21, 1969

3,423,274
THERMOPLASTIC WRAPPING MATERIALS HAVING TRANSLUCENT AREAS AND PROCESS THEREFOR
William J. Lahm, Bound Brook, Peter Wilton, Plainfield, and Walter Egan, Berkeley Heights, N.J., assignors to Union Carbide Corporation, a corporation of New York
No Drawing. Filed Aug. 30, 1965, Ser. No. 483,855
U.S. Cl. 161—6     20 Claims
Int. Cl. D06n 7/04; B44d 5/06; B29c 25/00

This invention relates to an improved thermoplastic wrapping material and a process for the preparation thereof. More particularly, this invention relates to thermoplastic wrapping materials possessing cling characteristics and exhibiting improved handleability and to a process for the preparation thereof.

Thermoplastic wrapping materials possessing cling characteristics have become increasingly more popular in recent years due to their economic advantage over metallic foils and waxed paper and, more importantly, due to their wide applicability in household use.

A major problem which has, however, hindered widespread consumer acceptance of thermoplastic wrapping materials possessing cling characteristics has been the inability which has heretofore existed in achieving a balance between effective "cling" and good handleability. "Cling" as used herein is that property of a thermoplastic film either imparted thereto by suitable additives or occurring naturally therein which enables the film to stick or "cling" to itself and to other smooth surfaces. Thus, when used for wrapping or to cover a smooth container, it seals and substantially reduces the exchange of air, odors and water vapor between the atmosphere and the interior of the package. However, most transparent wrapping films either cling too much to themselves and therefore require careful handling after unrolling to keep the film from sticking to itself before it is used or are readily handleable but exhibit little, if any, cling. Although the benefits of a cling wrap are highly desirable, the concomitant annoyance resulting from poor handleability has presented a formidable barrier to widespread consumer acceptance.

Several attempts have heretofore been made to balance cling and handleability in thermoplastic films. Handleability can be improved by decreasing the amount of cling agent or, in some instances, the plasticizer added to the film. This alternative, of course, results in a decrease in the effective cling of the film. Thus the improvement in handleability is substantially offset by the loss in cling. Moreover, while cling can be controlled by regulating the amount of cling agent, this becomes unfeasible on a commercial scale due to the different cling requirements which vary with the gauge, i.e., the thickness, of the thermoplastic film, i.e., the cling characteristic decreases with increasing thickness of the film. If the cling characteristic for various gauge films was regulated by the amount of cling additive present, this would necessitate large inventories of polymer batches containing varying amounts of cling additive thereby substantially affecting the economics of the processing operation.

Thus, the thermoplastic wrapping materials presently on the market either cling too much to themselves and present severe problems in handling or are readily handleable but exhibit no cling characteristics.

Accordingly, it is an object of the present invention to provide a thermoplastic wrapping material exhibiting balanced properties, i.e., good handleability as well as a commercially acceptable level of cling.

It is another object of the present invention to provide a wrapping material containing a visible and readily identifiable pattern therein which substantially increases the aesthetic appeal of the wrapping material.

It is a further object of the present invention to provide a one-step, continuous, in line process which permits the rapid and efficient preparation of the improved wrapping material of the present invention.

These and other objects are accomplished by the present invention which provides self-supporting, substantially crystalline polyolefin film exhibiting cling characteristics and having a repeating pattern therein segregating the film into alternate areas of glossy, transparent film and hazy, translucent film, said translucent areas being of higher crystallinity and orientation than said transparent areas, whereby the handleability of the film is substantially improved without a substantial sacrifice in cling properties.

The polyolefin film exhibiting cling characteristics and improved handleability is produced by a process which comprises feeding a crystallizable, polyolefin web adapted to exhibit cling characteristics in the final product in at least a heat softened, amorphous state onto a temperature controlled differential cooling roll, maintaining the web in contact with said roll for at least a portion of the cooling cycle, differentially cooling the web during contact with said roll to impart a repeating differentially crystallized pattern thereto and withdrawing from said roll a self-supporting, crystalline polyolefin film exhibiting improved handleability without a substantial sacrifice in cling properties.

Polyolefins suitable for use in the present invention are those which are normally crystallizable film-forming resins. Exemplary of such polyolefins are polyethylene, polypropylene, copolymers of ethylene and propylene, and polymers obtained from ethylene or propylene copolymerized with relatively minor amounts of other monoolefinic monomers such as butene-1, isobutylene, acrylic acids, esters of acrylic acids, vinyl acetate, styrene, and the like or combinations thereof. Generally, the crystalline films are from about 30 to about 80 percent crystalline. The polyolefin films either naturally possess cling properties or are cling modified by incorporating therein suitable amounts of a cling additive. Generally, the cling additive is present in an amount imparting an effective degree of cling but less than that imparting tackiness to the polyolefin film formed from said film-forming resin; this will vary with the particular polyolefin. Cling additives are well known in the art. Exemplary of the additives which impart effective cling properties to a polyolefin film are the mono- and diglycerides of fat-forming fatty acids and mixtures thereof, as described in U.S. 3,048,263 to Sacks et al.; esters and ethers of ethylene oxide as described in U.S. 3,048,266 to Hackhel et al.; amines and amides containing at least one ethylene oxide group as described in U.S. 3,048,265 to Hackhel et al. and other similar cling agents. In the present invention, however, the mono- and diglycerides of fat-forming fatty acids are preferred. The cling additive can be applied by any of the conventional techniques, i.e., spraying, dipping and the like. The incorporation of the cling agent into the polyolefin is preferred over other methods resulting in an initial surface coating. The most preferred composition for use in the present invention is polyethylene resin having a density within the range of from 0.914 to 0.970 and a melt index[1] of from about 2 to 8 containing from about 0.5 percent to 4 percent of a cling additive incorporated therein.

In accordance with the present invention there is provided a process which imparts a visible and readily identifiable pattern to a thermoplastic film-forming resin adapted to exhibit cling properties in the final product thereby substantially improving the handleability of the film without adversely affecting the cling properties. The pattern is imparted to the film in a continuous in line

[1] ASTM D1238577.

operation which is specifically designed to take advantage of the haze formation which occurs during cooling of a crystallizable film.

All crystalline polymers which are capable of melting without decomposition are transparent in their molten, amorphous state. After slow cooling and crystallization, however, they become translucent, opaque or hazy providing a frosted appearance in the film. The origin of this opacity or haze is believed to be light scattering from boundaries, between domains of different refractive index, created by the crystallization. Polymer crystallites are normally small in comparison with the wavelength of light and therefore do not in themselves contribute materially to the scattering. Polymer crystallites, however, have a so-called spherulitic growth habit, i.e., they form polycrystalline aggregates when grown from the melt. Within these aggregates, as well as at boundaries between them, interfaces are formed between amorphous and crystalline domains of different refractive index. Moreover, since the refractive index varies with the crystallographic direction within a crystallite, orientation differences between adjacent crystalline regions also lead to scattering. Furthermore, surface irregularities caused by crystalline aggregates also contribute markedly to the haze or opacity after crystallization.

Thus, while the glossy transparent areas of the film exhibit high cling characteristics, the hazy, translucent areas have been found to exhibit little, if any, cling. By proper balance of the ratio of the translucent areas to the transparent areas, a readily controllable means is provided for regulating the handleability of the film without substantially affecting the cling characteristics.

In the practice of the present invention, a crystallizable, polyolefin web adapted to exhibit cling in the final product in at least a heat softened, amorphous state is fed onto a differential cooling roll to be described in more detail hereinbelow, the roll is maintained at a temperature below the crystallization temperature of the polyolefin. The web is maintained in close contact with the roll for at least a portion of the cooling cycle. Proper contact of the web with the roll is maintained preferably through use of air pressure, for example, an air knife situated immediately above and extending across the roll. Upon traversing the roll, the web is differentially cooled thereby imparting a "frosted" pattern in the resultant film which is attributable to the formation of the translucent or opaque regions described hereinabove. The resultant film is then passed to take off rolls where it is subsequently wound for future use.

The amorphous crystallizable web can be fed to the differential cooling roll either directly from an extruder equipped with a slot die, by heating a pre-formed film until it is in an amorphous crystallizable state, or other similar means for obtaining a moving amorphous web of a crystallizable polyolefin. Line speeds of the moving web can vary from about 100 to about 1000 feet per minute. At speeds less than about 300 feet per minute, it has been found that pattern definition is not as sharp as at higher speeds. This is most likely attributable to a decrease in the differential cooling rates between the opaque and transparent areas of the film at lower speeds. Accordingly, line speeds of from about 300 to 1000 feet per minute are preferred. The line speed is also dependent upon the thickness of the film being fed to the cooling roll. As the thickness of the film increases, lower line speeds can be employed to insure adequate cooling. Film thicknesses contemplated within the present invention range from about 0.25 to about 10 mils. Preferably, the film thickness is from about 0.40 to about 0.70 mils. It has been found that thicknesses below about 0.25 mil provide difficulties in processing whereas in film above 10 mils in thickness the opaque pattern is obscured and tends to result in a quilted effect in the film or sheeting.

It has been found that the air knife plays an important role in obtaining good pattern definition in the film. The velocity of the air emanating from the air knife can vary from about 1000 to about 4000 feet per minute. It is, of course, apparent that as the line speed increases, the air velocity must commensurately increase to insure proper contact of the web with the roll and also to provide adequate cooling. The position of the air knife with respect to the cooling roll is primarily governed by the angle and height of the air knife above the roll which will insure proper contact of the web with the roll. It is considered preferable to maintain the air knife less than about one inch from the roll surface.

The differential cooling roll is maintained at a temperature below the crystallization temperature of the polyolefin but above roll temperatures which would rapidly cool the film and, in essence, quench the film as is done in chill roll casting. In quenching processes, crystallization is arrested by the increase in viscosity of the amorphous phase. Thus, large well-developed crystalline aggregates do not have time to form; therefore, clear, transparent film is obtained at a sacrifice in crystallinity. Preferably, the roll temperature is maintained as high as possible without detracting from the clarity of the transparent areas of the film to allow slower cooling and thereby enhance pattern definition.

The differential cooling roll of the present invention is basically a cooling roll having a continuous repeating pattern therein comprised of a plurality of figurative designs outlined on the roll surface by raised bosses. The bosses outlining the figures are isolated one from the other by grooves recessed in the surface of the roll. The recessed grooves permit slower air cooling of the portions of the web above the grooves thereby imparting a higher degree of crystallinity in these areas resulting in a translucent, frosted outline surrounding each figure.

The particular figurative design employed is not considered narrowly critical thus any desired configuration can be employed such as triangular, rectangular, square, polyhedral, hexagonal, octagonal, circular, elliptical and combinations thereof, or even particular figures or abstract designs such as hearts, diamonds, floral patterns and the like. It is considered critical, however, that the ratio of the surface area of the translucent or frosted outline surrounding the figurative design to the surface area of the glossy, transparent design itself be at least sufficient to provide an effective improvement in handleability but less than that which will reduce the cling characteristic of the film to an inadequate level for effective use. Moreover, it is also considered critical that the surface area of the figurative design be sufficiently large to provide an adequate level of cling but less than that which will obscure any improvement in handleability afforded by the translucent or frosted outline encompassing said design. It has been found that the surface area ratio of the translucent to transparent portions of the film can range from about 1:2 to about 1:15 and most preferably from about 1:3 to 1:8. Above a surface area ratio of about 1:15 there is no appreciable improvement in handleability whereas below a surface area ratio of about 1:2 handleability is greatly improved but at too great a sacrifice in cling. In conjunction with said surface area ratios, it has been found that the surface areas of the figurative design employed can vary from about 0.01 to about 0.5 square inch. The surface area ratios and the surface area of the particular design employed are interdependent parameters. Thus, as will be shown hereafter (Table I), a film exhibiting balanced cling and handleability is obtained only when the figurative pattern is within both the surface area ratio range and the surface area range of the particular design employed as herein defined.

Thus, the differential cooling roll can have a continuously repeating pattern engraved therein of any desired design. The pattern can be etched into the roll by conventional methods so as to provide an outlining boss completely encompassing each individual figure. It has been found that the height of a boss above the roll surface must be at least sufficient when acting in concert with the recessed grooves in the roll immediately adjacent thereto to provide a sufficient column of air to slowly cool those portions of the film immediately above the recessed grooves thereby increasing the crystallization of the film in those areas to render them opaque. The height of the boss above the roll surface is not, however, sufficient to provide any substantial mechanical deformation of the film or puckering. The boss height can range from about 1 to about 5 mils above the surface of the roll. Below about 1 mil, it was found that substantially no opacity was imparted to the film whereas above about 5 mils, substantial puckering of the film was encountered. In instances where the recessed grooves can be etched deep enough into the roll to provide sufficient cooling by itself, the boss can be eliminated and opacity still produced in its absence.

Quite unexpectedly, it has been found that by engraving a pattern on the land surfaces of the raised bosses a sharper pattern definition is obtained together with some additional increase in handleability. It is considered preferable in the present invention that the raised bosses bear an engraved pattern for example, mesh screening, matting and the like.

Immediately adjacent to the bosses outlining the figures and isolating one figure from another are grooves recessed in the surface of the roll. The recessed grooves permit slower air cooling of those portions of the web immediately above the grooves; therefore, the depth of the grooves must be at least sufficient to provide slow cooling of the film. Grooves recessed to a depth of from about 5 mils to about 20 mils have been found suitable; however, depths of from about 8 to 16 mils are preferred.

The following examples are merely for illustrative purposes and are in no way intended to limit the scope of the invention as herein set forth.

In the following examples, polyethylene having a density of about 0.936 and a melt index of 6.5 and containing about 2.5 percent glyceryl monooleate is extruded onto a casting roll by a 2½″ extruder equipped with a 30 inch wide slot die. The extrusion temperature is maintained between about 465° F. to 500° F. The casting roll is maintained at temperatures between about 100° F. to 150° F. Control samples are obtained by extruding onto a uniformly flat roll; whereas, the film of the present invention is obtained by extruding onto an engraved differential cooling roll. The line speed is maintained at about 300 feet per minute. An air knife is employed to insure good contact of the web with the roll. The air knife is maintained about 1 inch from the roll at an angle of about 65 degrees with the horizontal plane of the axis. The velocity of the air emanating from the air knife is maintained at about 3500 feet per minute. In each instance, film 0.5 mil in thickness is obtained.

The cling property of the resulting films is determined by the inverted beaker test, i.e., over the open end of an 800 ml. glass beaker containing 300 ml. of water is draped a film sample 9.5 inches square. The film is secured to the beaker by finger pressure. The beaker is then inverted and shaken. The number of shakes required to cause failure is taken as a measure of cling. The average of seven tests is used hereinbelow for the cling rating of each film. To test handleability, a one foot length of film is shaken in the air about three times. The samples having poor handleability readily cling to themselves and are extremely difficult to separate. Those having good handleability will not cling together; or, if they do are easily separated.

TABLE I

| Example | Film pattern | Ratio of translucent/transparent film | Surface area of pattern (in.²) | Cling | Handleability |
|---|---|---|---|---|---|
| Control | No pattern | 0 | | 14.3 | Very poor. |
| 1 | One inch squares surrounded by ¹⁄₆₄ inch wide translucent border. | 1:15.7 | 1 | 14 | Do. |
| 2 | Hexagons ⅜ inch across the flats surrounded by ¹⁄₃₂ inch transparent border with 50 mesh screen pattern therein. | 0 | 0.0703 | 13.0 | Poor. |
| 3 | Hexagons ⅝ inch across the flats surrounded by ¹⁄₁₆ inch transparent border with 50 mesh screen pattern therein. | 0 | 0.1952 | 11.0 | Fair. |
| 4 | Isosceles triangles having a ⅜ inch base and equal angles having tan⁻¹=2 surrounded by ¹⁄₁₆ inch transparent border. | 0 | 0.0703 | 9.0 | Do. |
| 5 | Hexagons ⅝ inch across the flats surrounded by ¹⁄₃₂ inch transparent border with 50 mesh screen pattern therein and ¹⁄₃₂ inch translucent border. | 1:3.50 | 0.1952 | 8.0 | Very good. |
| 6 | Squares ¹⁄₃₂ inch on a side surrounded by ¹⁄₆₄ inch translucent border. | 3:1 | 0.0009 | 1 | Do. |

As can be seen from Table I, supra, only the film sample having a pattern wherein the surface area ratio of translucent to transparent film was between 1:2 to 1:15 and the surface area of the individual figures was between 0.01 and 0.5 square inches exhibited balanced cling and handleability, i.e., the cling characteristic was retained at a commercially acceptable level and the handleability was very good. It can be further seen that in instances where insufficient translucent areas appear in the film (1), no appreciable improvement in handleability is obtained; however, where excessive translucent areas appear in the film (6), the handleability is excellent but the cling characteristic is essentially lost. Still further, a comparison of Examples 2–5 illustrate that the improved wrapping material of the present invention exhibiting a visible and readily identifiable pattern is produced only by extrusion onto a differential cooling roll having a repeating pattern therein of a figurative design outlined by bosses as defined herein and wherein the figures are isolated one from the other by grooves suitably recessed into the roll as described herein to impart translucent areas to the film which act as cling modulators to provide a wrapping material of improved handleability.

Thus, the present invention has provided a wrapping material and a method for the production thereof which enables a suitable and desirable balance to be obtained between cling and handleability in a simple, readily controllable, in-line operation. Moreover, the present invention has provided a wrapping material of enhanced aesthetic appeal due to the visible and readily identifiable pattern therein.

What is claimed is:
1. A self-supporting substantially crystalline polyolefin film exhibiting cling characteristics and having a repeating pattern therein segregating the film into alternate areas of glossy, transparent film and hazy, translucent film, said translucent areas being of higher crystallinity and orientation than said transparent areas, whereby the handleability of the film is substantially improved without a substantial sacrifice in cling properties.

2. A self-supporting substantially crystalline polyolefin film exhibiting cling characteristics and having a repeating visual pattern therein segregating the film into alternate areas of glossy, transparent film and hazy, translucent film, said translucent areas being of higher crystallinity and orientation than said transparent areas, the ratio of the surface area of the translucent areas to the surface area of the transparent areas being at least sufficient to provide an effective improvement in handleability but less than that which will reduce the cling to an ineffective level.

3. A self-supporting substantially crystalline polyolefin film as defined in claim 2 wherein the ratio of the surface area of the translucent areas to the surface area of the transparent areas ranges from about 1:2 to about 1:15.

4. A self-supporting substantially crystalline polyolefin film exhibiting cling characteristics and having a repeating visual figurative design therein segregating the film into alternate areas of glossy, transparent film and hazy, translucent film, wherein the ratio of the surface area of the translucent areas to the surface area of the transparent areas ranges from about 1:2 to about 1:15 and the surface area of the individual figures in said figurative design ranges from about 0.01 to about 0.5 square inch.

5. A self-supporting substantially crystalline polyethylene film exhibiting cling characteristics and having a repeating figurative design therein without substantial mechanical deformation segregating the film into alternate areas of glossy, transparent film and hazy, translucent film, said translucent areas being of higher crystallinity and orientation than said transparent areas, the ratio of the surface area of the translucent areas to the surface area of the transparent areas being at least sufficient to provide an effective improvement in handleability but less than that which will reduce the cling to an ineffective level.

6. A self-supporting, substantially crystalline polyethylene film as defined in claim 4 wherein the ratio of the surface area of the translucent areas to the surface area of the transparent areas ranges from about 1:2 to about 1:15.

7. A self-supporting, substantially crystalline polyethylene film as defined in claim 5 wherein the surface area ratio ranges from about 1:3 to 1:8.

8. A self-supporting, substantially crystalline polyethylene film as defined in claim 4 wherein the surface area of the individual figures in said figurative design ranges from about 0.01 to about 0.5 square inch.

9. A self-supporting, substantially crystalline polyethylene film as defined in claim 4 wherein the cling additive is a member selected from the group consisting of mono- and di-glycerides of fat-forming fatty acids and mixtures thereof.

10. Process for producing cling-modified polyolefin film of improved handleability which comprises feeding a crystallizable, polyolefin web adapted to exhibit cling characteristics in the final product, in at least a heat softened, amorphous state onto a temperature controlled differential cooling roll, maintaining the web in contact with said roll for at least a portion of the cooling cycle, differentially cooling the web during contact with said roll to impart a repeating differentially crystallized pattern thereto and withdrawing from said roll a self-supporting, cling-modified substantially crystalline polyolefin film exhibiting improved handleability without a substantial sacrifice in cling.

11. Process for producing cling-modified polyolefin film of improved handleability which comprises feeding a crystallizable polyolefin web containing a cling additive in an amount imparting an effective degree of cling but less than that imparting tackiness to the polyolefin film, in at least a heat softened, amorphous state onto a differential cooling roll maintained at a temperature below the crystallization temperature of the polyolefin, maintaining the web in contact with said roll for at least a portion of the cooling cycle by application of external pressure thereto, differentially cooling the web during contact with said roll to impart a repeating differentially crystallized pattern thereto, and withdrawing from said roll a self-supporting, cling-modified crystalline polyolefin film exhibiting a visual pattern therein segregating the film into areas of glossy, transparent film and hazy, translucent film whereby the handleability of the film is improved without a substantial sacrifice in cling.

12. Process for producing cling-modified polyolefin film of improved handleability as defined in claim 11 wherein the crystallizable polyolefin web is fed to the differential cooling roll at line speeds of from about 100 to 1000 feet per minute.

13. Process for producing cling-modified polyolefin film of improved handleability as defined in claim 12 wherein the line speed is from about 300 to 1000 feet per minute.

14. Process for producing cling-modified polyolefin film of improved handleability as defined in claim 11 wherein the web is maintained in contact with the differential cooling roll by the air pressure of an air knife having an air velocity of from about 1000 to 4000 feet per minute.

15. Process for producing cling-modified polyolefin film of improved handleability which comprises feeding a substantially crystallizable polyolefin web containing a cling additive in an amount imparting an effective degree of cling but less than that imparting tackiness to the polyolefin film at line speeds of from about 100 to 1000 feet per minute, in at least a heat softened, amorphous state onto a differential cooling roll maintained at a temperature below the crystallization temperature of the polyolefin but above that temperature which would rapidly quench the film, maintaining the web in contact with said roll for at least a portion of the cooling cycle by the air pressure of an air knife having an air velocity of from about 1000 to 4000 feet per minute, differentially cooling the web during contact with said roll to impart a repeating differentially crystallized pattern thereto, and withdrawing from said roll a self-supporting, cling-modified crystalline polyolefin film exhibiting a visual pattern therein segregating the film into areas of glossy, transparent film and hazy, translucent film whereby the handleability of the film is improved without a substantial sacrifice in cling.

16. Process for producing cling-modified polyolefin film of improved handleability which comprises feeding a crystallizable polyolefin web containing a cling additive in an amount imparting an effective degree of cling but less than that imparting tackiness to the polyolefin film, in at least a heat softened, amorphous state onto a differential cooling roll maintained at a temperature below the crystallization temperature of the polyolefin, said roll having a continuous repeating figurative design therein comprised of a plurality of figures outlined by raised bosses, said outlining bosses being isolated one from the other by grooves recessed in the surface of the roll, maintaining the web in contact with said roll for at least a portion of the cooling cycle by application of external pressure thereto, differentially cooling the web during contact with said roll to impart a repeating differentially crystallized pattern thereto, and withdrawing from said roll a self-supporting, cling modified crystalline polyolefin film exhibiting a visual pattern therein segregating the film into areas of glossy, transparent film and hazy, translucent film whereby the handleability of the film is improved without a substantial sacrifice in cling.

17. Process for producing cling-modified polyolefin film of improved handleability as defined in claim 16 wherein the height of the outlining bosses above the surface of the differential cooling roll is at least sufficient when acting in concert with the recessed grooves immediately adjacent thereto to impart translucency to the film but less than that which will provide any substantial mechanical deformation of the film.

18. Process for producing cling-modified polyolefin film of improved handleability as defined in claim 17 wherein the height of the outlining bosses above the surface of the differential cooling roll ranges from about 1 to about 5 mils.

19. Process for producing cling-modified polyolefin film of improved handleability as defined in claim 16 wherein the grooves recessed in the surface of the differential cooling roll extend to a depth of from about 5 to about 20 mils below the surface of said roll.

20. Process for producing cling-modified polyolefin film if improved handleability as defined in claim 16 wherein the continuous repeating figurative design in the differential cooling roll is of a configuration sufficient to impart to the resulting film a ratio of the surface area of the translucent areas therein to the surface area of the transparent areas therein which ranges from about 1:2 to about 1:15 and wherein the surface area of the individual figures in said figurative design ranges from about 0.01 to about 0.5 square inch.

References Cited

UNITED STATES PATENTS

| | | | |
|---|---|---|---|
| 3,112,300 | 11/1963 | Natta et al. | 260—93.7 |
| 3,345,447 | 10/1967 | Grant | 264—235 |

ROBERT F. BURNETT, *Primary Examiner.*

W. J. VAN BALEN, *Assistant Examiner.*

U.S. Cl. X.R.

161—166; 264—235, 237, 346, 348